US012000025B2

(12) United States Patent
Sharma

(10) Patent No.: US 12,000,025 B2
(45) Date of Patent: Jun. 4, 2024

(54) POWDER COMPOSITION FOR ADDITIVE MANUFACTURING

(71) Applicant: Satyajeet Sharma, Charlotte, NC (US)

(72) Inventor: Satyajeet Sharma, Charlotte, NC (US)

(73) Assignee: Satyajeet Sharma, Charlotte, NC (US)

( * ) Notice: Subject to any disclaimer, the term of this patent is extended or adjusted under 35 U.S.C. 154(b) by 808 days.

(21) Appl. No.: 17/050,802

(22) PCT Filed: Apr. 25, 2019

(86) PCT No.: PCT/IB2019/053413
§ 371 (c)(1),
(2) Date: Oct. 26, 2020

(87) PCT Pub. No.: WO2019/207518
PCT Pub. Date: Oct. 31, 2019

(65) Prior Publication Data
US 2021/0086259 A1    Mar. 25, 2021

Related U.S. Application Data

(60) Provisional application No. 62/662,352, filed on Apr. 25, 2018.

(30) Foreign Application Priority Data

Mar. 28, 2019 (DE) .......................... 102019002231.9

(51) Int. Cl.
*C22C 19/05* (2006.01)
*B22F 1/00* (2022.01)
(Continued)

(52) U.S. Cl.
CPC .............. *C22C 19/056* (2013.01); *B22F 1/00* (2013.01); *B22F 10/00* (2021.01); *B33Y 10/00* (2014.12);
(Continued)

(58) Field of Classification Search
None
See application file for complete search history.

(56) References Cited

U.S. PATENT DOCUMENTS 6,177,046 B1 * 1/2001 Simkovich ............ C22C 19/056
148/427
2021/0355564 A1 * 11/2021 Belaygue ............... B33Y 10/00

FOREIGN PATENT DOCUMENTS

CN    105828983 A    8/2016
CN    107709586 A    2/2018
(Continued)

OTHER PUBLICATIONS

Fenglin Han "Basic course of powder metallurgy—Basic principle and Application," Jun. 2006, p. 240, South China University of Technology Press, Guangzhou.

*Primary Examiner* — George Wyszomierski

(57) ABSTRACT

738LC composition belongs to Ni-based super-alloy family. The alloy has been successfully used for hot section of turbine engine. Blades, Vanes and heat shields are made out of the alloy which can sustain a working temperature of 700 to 850 deg C. Additive manufacturing processes like Selective laser melting or PBF-L are not successful in using the alloy powder due to cracking issues. 738LC is also known to fall under the category of non-weldable alloys due to high content of gamma prime phase. The invention of the new composition is outside the standard 738LC with different concentration, morphology and size distribution of gamma prime phase. The invention has shown to eliminate the cracking issue in AM laser based process. The room temperature tensile properties observed are much better than cast 738LC properties.

2 Claims, 6 Drawing Sheets

| Element | | Spec. Required | | Target |
|---|---|---|---|---|
| | | min [wt%] | max [wt%] | [wt%] |
| Nickel | (Ni) | Balance | Balance | Balance |
| Chromium | (Cr) | 15.7 | 16.3 | 16 |
| Cobalt | (Co) | 8 | 9 | 8.5 |
| Aluminum | (Al) | 3.2 | 3.7 | 3.4 |
| Titanium | (Ti) | 3.2 | 3.7 | 3.4 |
| Al+Ti | | 6.5 | 7.2 | 6.8 |
| Tungsten | (W) | 2.4 | 2.8 | 2.6 |
| Tantalum | (Ta) | 1.5 | 2 | 1.75 |
| Molybdenum | (Mo) | 1.5 | 2 | 1.75 |
| Niobium | (Nb) | 0.6 | 1.1 | 0.9 |
| Carbon | (C) | 0.09 | 0.13 | 0.11 |
| Zirconium | (Zr) | 0.03 | 0.08 | 0.05 |
| Boron | (B) | - | 0.007 | LAP |
| Iron | (Fe) | 3.5 | 4 | |
| Copper | (Cu) | - | 0.1 | |
| Manganese | (Mn) | - | 0.02 | |
| Silicon | (Si) | - | 0.03 | |
| Phosphorus | (P) | - | 0.015 | |
| Sulfur | (S) | - | 0.006 | |
| Oxygen | (O2) | - | 0.03 | |
| Nitrogen | (N2) | - | 0.08 | |
| T.A.O. | | - | 0.15 | |

(51) Int. Cl.
*B22F 10/00* (2021.01)
*B33Y 10/00* (2015.01)
*B33Y 70/00* (2020.01)
*B33Y 80/00* (2015.01)

(52) U.S. Cl.
CPC ............... *B33Y 70/00* (2014.12); *B33Y 80/00* (2014.12); *B22F 2301/15* (2013.01)

(56) References Cited

FOREIGN PATENT DOCUMENTS

| | | | |
|---|---|---|---|
| EP | 2886225 | A1 | 6/2015 |
| EP | 3185253 | A1 | 6/2017 |
| EP | 3336210 | A1 | 6/2018 |
| EP | 3441489 | A1 | 2/2019 |
| JP | 2017508877 | A | 3/2017 |
| WO | 2011020976 | A1 | 2/2011 |
| WO | 2017026519 | A1 | 2/2017 |

* cited by examiner

Figure 1 prior art

| Element | | Spec. Required min [wt%] | Spec. Required max [wt%] | Target [wt%] |
|---|---|---|---|---|
| Nickel | (Ni) | Balance | Balance | Balance |
| Chromium | (Cr) | 15.7 | 16.3 | 16 |
| Cobalt | (Co) | 8 | 9 | 8.5 |
| Aluminum | (Al) | 3.25 | 3.7 | 3.4 |
| Titanium | (Ti) | 3.25 | 3.7 | 3.4 |
| Al+Ti | | 6.5 | 7.2 | 6.8 |
| Tungsten | (W) | 2.4 | 2.8 | 2.6 |
| Tantalum | (Ta) | 1.5 | 2 | 1.75 |
| Molybdenum | (Mo) | 1.5 | 2 | 1.75 |
| Niobium | (Nb) | 0.6 | 1.1 | 0.9 |
| Carbon | (C) | 0.09 | 0.13 | 0.11 |
| Zirconium | (Zr) | 0.03 | 0.08 | 0.05 |
| Boron | (B) | 0.007 | 0.012 | 0.01 |
| Iron | (Fe) | - | 0.05 | |
| Copper | (Cu) | - | 0.1 | |
| Manganese | (Mn) | - | 0.02 | |
| Silicon | (Si) | - | 0.03 | |
| Phosphorus | (P) | - | 0.015 | |
| Sulfur | (S) | - | 0.006 | |
| Oxygen | (O2) | - | 0.03 | |
| Nitrogen | (N2) | - | 0.02 | |
| T.A.O. | | - | 0.15 | |

Figure 2 – Composition of 738-Mod1

| Element | | Spec. Required min [wt%] | Spec. Required max [wt%] | Target [wt%] |
|---|---|---|---|---|
| Nickel | (Ni) | Balance | Balance | Balance |
| Chromium | (Cr) | 15.7 | 16.3 | 16 |
| Cobalt | (Co) | 8 | 9 | 8.5 |
| Aluminum | (Al) | 3.2 | 3.7 | 3.4 |
| Titanium | (Ti) | 3.2 | 3.7 | 3.4 |
| Al+Ti | | 6.5 | 7.2 | 6.8 |
| Tungsten | (W) | 2.4 | 2.8 | 2.6 |
| Tantalum | (Ta) | 1.5 | 2 | 1.75 |
| Molybdenum | (Mo) | 1.5 | 2 | 1.75 |
| Niobium | (Nb) | 0.6 | 1.1 | 0.9 |
| Carbon | (C) | 0.09 | 0.13 | 0.11 |
| Zirconium | (Zr) | 0.03 | 0.08 | 0.05 |
| Boron | (B) | - | 0.007 | LAP |
| Iron | (Fe) | 3.5 | 4 | |
| Copper | (Cu) | - | 0.1 | |
| Manganese | (Mn) | - | 0.02 | |
| Silicon | (Si) | - | 0.03 | |
| Phosphorus | (P) | - | 0.015 | |
| Sulfur | (S) | - | 0.006 | |
| Oxygen | (O2) | - | 0.03 | |
| Nitrogen | (N2) | - | 0.08 | |
| T.A.O. | | - | 0.15 | |

Figure 3 - Composition of 738-Mod2

| Element | | Specification Required | | Target |
|---|---|---|---|---|
| | | min [wt%] | max [wt%] | [wt%] |
| Nickel | (Ni) | Balance | Balance | Balance |
| Chromium | (Cr) | 15.7 | 16.3 | 16 |
| Cobalt | (Co) | 8 | 9 | 8.5 |
| Aluminum | (Al) | 1.75 | 2.25 | 2 |
| Titanium | (Ti) | 1.75 | 2.25 | 2 |
| Al+Ti | | 3.5 | 4.5 | 4 |
| Tungsten | (W) | 2.4 | 2.8 | 2.6 |
| Tantalum | (Ta) | 1.5 | 2 | 1.75 |
| Molybdenum | (Mo) | 8.5 | 9.5 | 9 |
| Niobium | (Nb) | 0.6 | 1.1 | 0.9 |
| Carbon | (C) | 0.09 | 0.13 | 0.11 |
| Zirconium | (Zr) | 0.03 | 0.08 | 0.05 |
| Boron | (B) | 0.007 | 0.012 | 0.01 |
| Iron | (Fe) | - | 0.05 | |
| Copper | (Cu) | - | 0.1 | |
| Manganese | (Mn) | - | 0.02 | |
| Silicon | (Si) | - | 0.03 | |
| Phosphorus | (P) | - | 0.015 | |
| Sulfur | (S) | - | 0.006 | |
| Oxygen | (O2) | - | 0.03 | |
| Nitrogen | (N2) | - | 0.08 | |
| T.A.O. | | - | 0.15 | |

Figure 4 – Material properties of standard and non-standard 738LC alloy powder composition additively manufactured at room temperature in X, Y and Z direction

| ID | Orientation | UTS (ksi) | YS (ksi) | El (%) |
|---|---|---|---|---|
| 738LC-STD | X | 170.38 | 147.54 | 3.48 |
| 738-Mod1 | X | 182.25 | 150.65 | 6.25 |
| 738-Mod2 | X | 198.7 | 174.02 | 3.3 |
| 738LC-STD | Y | 171.32 | 145.38 | 4.14 |
| 738-Mod1 | Y | 185.64 | 146.94 | 5.8 |
| 738-Mod2 | Y | 202 | 174.46 | 2.7 |
| 738LC-STD | Z | 202.71 | 141.44 | 10.3 |
| 738-Mod1 | Z | 203.07 | 142.66 | 11.8 |
| 738-Mod2 | Z | 212.98 | 166.3 | 8.3 |
| CAST &HT | - | 137.1 | 111 | 7.5 |
| AMS 5410 | - | 130 | 115 | 3 |

Figure 5: Modified gamma prime phase in a) 738-Mod1 and b) 738-Mod2 as compare to c) Cast&HT, SEM images @20000x mag
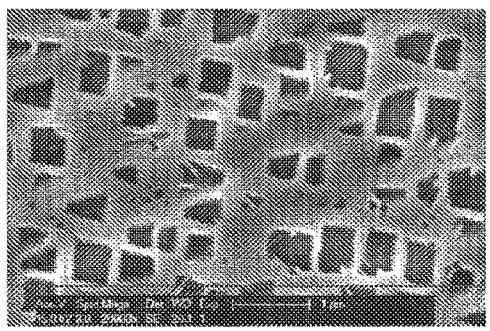
a)
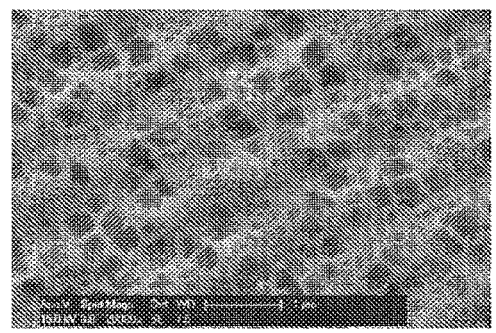
b)
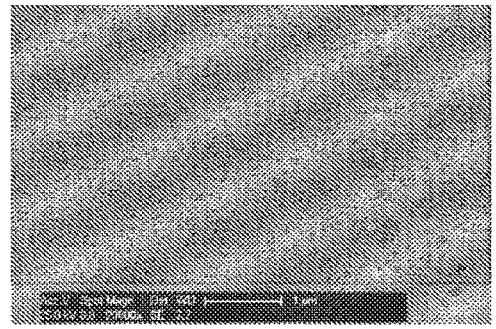
c)

Figure 6: Material properties of standard and non-standard 738LC alloy powder composition additively manufactured at 1500 °F in Z direction
| ID | UTS (ksi) | YS (ksi) | El (%) |
|---|---|---|---|
| 738LC-STD | 119 | 80 | 18 |
| 738-Mod1 | 108 | 80 | 5 |
| 738-Mod2 | 114 | 95 | 16 |
| Cast & HT | 103 | 77 | 10 |
Figure 7: Microstructure in both horizontal and vertical direction
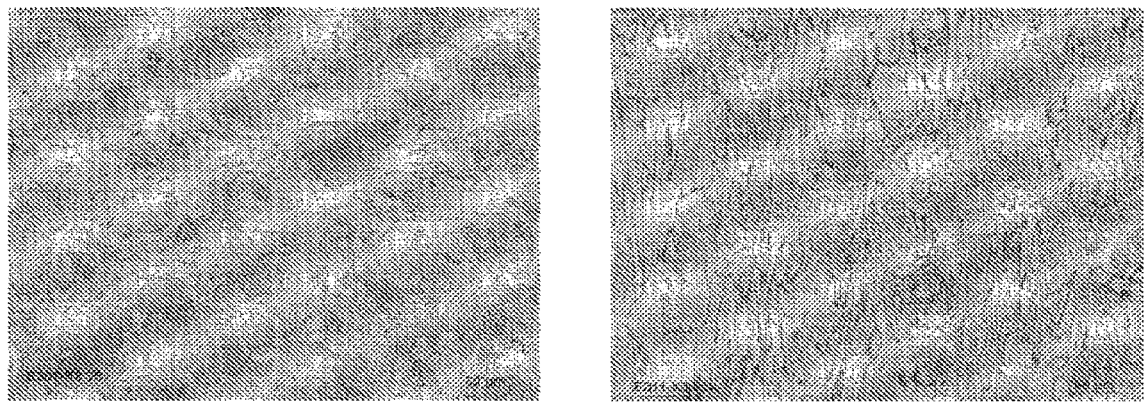

POWDER COMPOSITION FOR ADDITIVE MANUFACTURING

The invention is targeted towards printability of 738LC alloy powder. The alloy powder is known for its non-printability and formation of cracks during laser based powder bed process. Currently additive manufacturing (AM) users are using hot isostatic pressing (HIP) processes to mitigate certain amount of cracking. However due to the nature of the process not all cracks and imperfection caused during the process can be healed by HIP.

The present invention has the objective to disclose a more suitable composition for the specified AM process. The invention is able to offer a more reliable solution to the AM community. One important application of the new alloy powder will be land based turbine industries, as the powder can be used to develop new designs for high temperature components.

The above described objective is met with a non-standard Ni-based alloy compositions that can be printed with minimal to zero cracking. In the present description standard 738LC alloy shall have the composition as listed in FIG. 1. As per standard 738LC, the gamma prime phase has been quantitatively and qualitatively modified. The gamma prime phase in one of the new alloys is finer and unimodal in comparison to the prior art standard composition where it is of bi-modal and angular morphology. In the second new alloy the gamma prime phase retains its bimodal distribution but the morphology is relatively with smooth edges. The room temperature tensile properties thereby obtained are higher than standard 738LC composition. As mentioned above the standard 738LC composition is prone to cracking during laser based powder bed fusion process. Several mechanisms can cause micro-cracking in such alloys, it can be due to gamma prime phase precipitation that creates internal residual stresses or solidification cracking due to formation of low melting phase due to segregation or formation of certain type of grain boundaries which is known to create high internal stresses which in combination with elemental segregation can lead to hot cracking. In order to mitigate such stresses, and make the alloy printable, the approach to reduce the gamma prime content and improving the grain boundary character was undertaken. However, since it is known that gamma prime phases are also the contributors to high temperature strength and stability, so reduction of this phase has to be compensated by other strengthening techniques. This requirement was met with increasing a solid solution strengthener with a high temperature resistant property and atomic size.

The invention will be now described in detail with the help of examples.

FIG. 1 is a table which shows the composition of the standard 738LC powder,

FIG. 2 is a table which shows the composition of a first embodiment of the present invention, FIG. 3 is a table which shows the composition of a second embodiment of the present invention, FIG. 4 shows the room temperature properties as compared to standard cast and heat treated 738LC alloy, FIG. 5 shows the modified gamma prime phase in
a) 738-Mod1 and
b) 738-Mod2 as compare to
c) Cast&HT FIG. 6 shows the material properties of standard and non-standard 738LC alloy powder composition, FIG. 7 shows the microstructure of a component in both horizontal and vertical direction.

As can be seen from FIG. 2 according to the first embodiment the boron content is kept as low as economically possible, however below 0.007 wt %, preferably below 0.005 wt %, more preferably 0.001 wt %, in any case (as compared to between 0.007 wt % and 0.012 wt % in the standard powder). In addition to this, the iron is introduced to an amount of between 3.5 wt % and 10 wt %, preferably between 3.5 wt % and 4 wt % (as compared to no iron in the standard powder or at most at 0.05 wt %). An amount of nitrogen may be included up to 0.08 wt %, preferably 0.06 wt %.

As can be seen from FIG. 3 according to the second embodiment of the present invention the aluminum and titanium content is decreased to an amount less than 3 wt %, preferably 2 wt %. The molybdenum content is increased to an amount greater than 8.5 wt %, preferably between 8 wt % and 9 wt %

FIG. 4 shows the material properties of standard and non-standard 738LC alloy powder composition additively manufactured at room temperature in X, Y and Z direction.

ID stands for the alloy powder. Orientation means the orientation in room direction.

UTS means Ultimate Tensile Strength. Ultimate tensile strength (UTS), often shortened to tensile strength (TS), ultimate strength, or Ftu within equations, is the capacity of a material or structure to withstand loads tending to elongate, as opposed to compressive strength, which withstands loads tending to reduce size. In other words, tensile strength resists tension (being pulled apart), whereas compressive strength resists compression (being pushed together). Ultimate tensile strength is measured by the maximum stress that a material can withstand while being stretched or pulled before breaking. In the study of strength of materials, tensile strength, compressive strength, and shear strength can be analyzed independently. Some materials break very sharply, without plastic deformation, in what is called a brittle failure. Others, which are more ductile, including most metals, experience some plastic deformation and possibly necking before fracture. The UTS is usually found by performing a tensile test and recording the engineering stress versus strain. The highest point of the stress—strain curve is the UTS. It is an intensive property; therefore its value does not depend on the size of the test specimen. However, it is dependent on other factors, such as the preparation of the specimen, the presence or otherwise of surface defects, and the temperature of the test environment and material.

The measuring method of measuring UTS is well known Typically, the testing involves taking a small sample with a fixed cross-sectional area, and then pulling it with a tensometer at a constant strain (change in gauge length divided by initial gauge length) rate until the sample breaks. When testing some metals, indentation hardness correlates linearly with tensile strength. This important relation permits economically important nondestructive testing of bulk metal deliveries with lightweight, even portable equipment, such as hand-held Rockwell hardness testers. This practical correlation helps quality assurance in metalworking industries to extend well beyond the laboratory and universal testing machines.

YS means Yield Strength. The yield point is the point on a stress-strain curve that indicates the limit of elastic behavior and the beginning of plastic behavior. Yield strength or yield stress is the material property defined as the stress at which a material begins to deform plastically whereas yield point is the point where nonlinear (elastic+plastic) deformation begins. Prior to the yield point the material will deform elastically and will return to its original shape when the applied stress is removed. Once the yield point is passed, some fraction of the deformation will be permanent and non-reversible. The yield point determines the limits of performance for mechanical components, since it represents the upper limit to forces that can be applied without permanent deformation. In structural engineering, this is a soft failure mode which does not normally cause catastrophic failure or ultimate failure unless it accelerates buckling. Yield strength is the critical material property exploited by many fundamental techniques of material-working: to reshape material with pressure (such as forging, rolling, pressing, bending, extruding, or hydroforming), to separate material by cutting (such as machining) or shearing, and to join components rigidly with fasteners. Yield load can be taken as the load applied to the centre of a carriage spring to straighten its leaves. The offset yield point (or proof stress) is the stress at which 0.2% plastic deformation occurs.

The measuring method of measuring YS is well known. This can be done for example by taking a small sample with a fixed cross-section area, and then pulling it with a controlled, gradually increasing force until the sample changes shape or breaks. This is called a Tensile Test. Longitudinal and/or transverse strain is recorded using mechanical or optical extensometers. Yield behaviour can also be simulated using virtual tests (on computer models of materials), particularly where macroscopic yield is governed by the microstructural architecture of the material being studied. Indentation hardness correlates roughly linearly with tensile strength for most steels, but measurements on one material cannot be used as a scale to measure strengths on another. Hardness testing can therefore be an economical substitute for tensile testing, as well as providing local variations in yield strength due to, e.g., welding or forming operations. However, for critical situations tension testing is done to eliminate ambiguity.

El means Elongation and is measured according to ASTM E139 (Standard Test Methods for Conducting Creep, Creep-Rupture, and Stress-Rupture Tests of Metallic Materials) with the measurement principle "Under load after break" (https://www.astm.org/Standards/E139.htm).

As seen in FIG. 5 the invention involved in modifying gamma prime phase both qualitatively and quantitatively. It was therefore necessary to investigate high temperature properties. FIG. 6 in the embodiment shows elevated temperature properties for both non-standard compositions as described in FIGS. 2 and 3.

In both of the modifications the properties are comparable to Cast and HT standard 738LC alloy. It is noted that due to the use of non-optimized heat treatment for AM materials, elongation in one case shows to be lower than what is obtained for cast material. This is evidenced by the etched microstructure as seen in FIG. 6 for non-standard composition. From FIG. 7 it is seen that morphology of grain structure is elongated in nature even after ageing treatment (perpendicular to build direction) due to epitaxial grain growth that occurs during additive manufacturing. This leads to the observation that recrystallization of grain structure has not occurred to obtain the maximum material property based on the standard heat treatment cycle as per AMS 5410 which comprises the steps of:

Solution Annealing at a temperature of 2050° F.+/−10° F. for 2 hr holding time

Ageing a temperature of 1550° F.+/−10° F. for 24 hr

A Ni based alloy powder with a composition corresponding to a modified 738LC alloy powder was disclosed. The composition deviates from the standard 738LC alloy powder in such a way that it can be used in additive manufacturing such as for example laser or electron beam based powder bed fusion process or direct metal deposition process with as compared to standard 738LC alloy in order to produce parts with reduced and preferably minimized and most preferably zero crack density.

The Ni based alloy powder can have as compared to 738LC alloy powder a quantitatively and/or qualitatively modified gamma prime phase.

The Ni based alloy powder according to one embodiment comprises boron at most 0.007 wt % and preferably below and that it comprises iron between 3.5 and 10 wt % and preferably between 3.5 and 4 wt %.

The Ni based alloy powder can as well comprise an aluminum content of less than 3 wt % and a molybdenum content of an amount greater than 8.5 wt % and preferably equal to 9 wt %.

The qualitatively modified gamma prime phase is preferably modified that way that the crack density shall be reduced by at least 10%, preferably by at least 25%, and particularly preferably by at least 50%, in particular with the same process parameters.

A 3D printed component was disclosed, comprising a material composition according to the Ni based alloy powders as described above.

The 3D printed component can have a morphology of the grain structure which is elongated in nature.

The invention claimed is:

1. A Ni-based alloy powder comprising a composition corresponding to a modified 738LC alloy powder, wherein the composition comprises:
   Chromium between 15.7 and 16.3 wt %,
   Cobalt between 8 and 9 wt %,
   Aluminum between 3.2 and 3.7 wt %,
   Titanium between 3.2 and 3.7 wt %,
   Tungsten between 2.4 and 2.8 wt %,
   Tantalum between 1.5 and 2 wt %,
   Molybdenum between 1.5 and 2 wt %,
   Niobium between 0.6 and 1.1 wt %,
   Carbon between 0.09 and 0.13 wt %,
   Zirconium between 0.03 and 0.08 wt %,
   Boron at most 0.007 wt %,
   Iron between 3.5 and 4 wt %,
   Copper at most 0.1 wt %,
   Manganese at most 0.02 wt %,
   Silicon at most 0.03 wt %,
   Phosphorus at most 0.015 wt %,
   Sulfur at most 0.006 wt %
   Oxygen at most 0.03 wt %,
   Nitrogen at most 0.08%,
   Total all others at most 0.15 wt %, and
   remainder Nickel;
   wherein the powder comprises a total of 6.5 to 7.2 wt % Aluminum and Titanium.

2. A 3D-printed component comprising a material composition according to the Ni-based alloy powder of claim 1.

* * * * *